United States Patent
Fujimoto

(10) Patent No.: US 10,298,050 B2
(45) Date of Patent: May 21, 2019

(54) POWER FEEDER

(71) Applicant: Funai Electric Co., Ltd., Daito, Osaka (JP)

(72) Inventor: Yoshitaka Fujimoto, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 359 days.

(21) Appl. No.: 15/236,579

(22) Filed: Aug. 15, 2016

(65) Prior Publication Data
US 2017/0063153 A1 Mar. 2, 2017

(30) Foreign Application Priority Data
Aug. 25, 2015 (JP) .................. 2015-166144

(51) Int. Cl.
H02J 50/00 (2016.01)
H02J 7/02 (2016.01)
H02J 9/00 (2006.01)
H04B 5/00 (2006.01)
H02J 50/12 (2016.01)

(52) U.S. Cl.
CPC .............. *H02J 7/025* (2013.01); *H02J 9/005* (2013.01); *H02J 50/12* (2016.02); *H04B 5/0037* (2013.01)

(58) Field of Classification Search
None
See application file for complete search history.

(56) References Cited

U.S. PATENT DOCUMENTS

| 2013/0285618 | A1 | 10/2013 | Iijima et al. | |
| 2015/0137748 | A1 | 5/2015 | Kim et al. | |
| 2015/0311956 | A1* | 10/2015 | Azancot | H02J 5/005 307/104 |
| 2016/0336816 | A1* | 11/2016 | Mach | H02J 50/80 |
| 2017/0043170 | A1* | 2/2017 | Guardiani | A61N 1/3787 |

FOREIGN PATENT DOCUMENTS

| EP | 2244351 A2 | 10/2010 |
| EP | 2816706 A1 | 12/2014 |
| JP | 2009-302798 A | 12/2009 |

OTHER PUBLICATIONS

Extended European Search Report of the corresponding European Application No. 16185443.5, dated Dec. 22, 2016.

* cited by examiner

*Primary Examiner* — Jared Fureman
*Assistant Examiner* — Aqeel H Bukhari
(74) *Attorney, Agent, or Firm* — Global IP Counselors, LLP

(57) ABSTRACT

A power feeder is provided that comprises a power output signal generator, and a controller. The power output signal generator generates a plurality of power output signals of different strengths. The controller performs an increasing or decreasing control to increase or decrease at least one of the strengths of the power output signals based on the strengths of the power output signals at which an electronic device has been detected.

19 Claims, 9 Drawing Sheets

POWER FEEDER

CROSS-REFERENCE TO RELATED APPLICATIONS

This application claims priority to Japanese Patent Application No. 2015-166144 filed on Aug. 25, 2015. The entire disclosure of Japanese Patent Application No. 2015-166144 is hereby incorporated herein by reference.

BACKGROUND

Field of the Invention

The present invention generally relates to a power feeder. More specifically, the present invention relates to a power feeder having a power output signal generator.

Background Information

A variety of devices equipped with a power output signal generator have been known up to now (see Japanese Laid-Open Patent Application Publication No. 2009-302798 (Patent Literature 1), for example).

The above-mentioned Patent Literature 1 discloses an access point device having a power output signal generator that generates a power output signal for detecting an electronic device, and a controller that controls the power output signal generator and so forth. This access point device generates power output signals from the power output signal generator at regular intervals. Also, the access point device is configured so that the interval at which the power output signals are generated can be lengthened by the controller in a standby state in which no electronic device has been detected. Consequently, the access point device uses less power in its standby state. With the power output signal generator, the power output signals are generated at a constant strength.

Also, a power feeder equipped with a power output signal generator is conventionally known.

SUMMARY

However, with a conventional power feeder equipped with a power output signal generator, if the generation interval of the power output signals is lengthened as with the access point device in the above-mentioned Patent Literature 1, there will be times when an electronic device is not detected right away. In such cases, it is conceivable that the user may become worried that the electronic device is not working, etc. That is, if an attempt is made to reduce power consumption by lengthening the interval at which the power output signals are generated, a potential problem is that user convenience will suffer.

One object of the present invention is to provide a power feeder with which power consumption in a standby state can be suppressed without compromising user convenience.

In view of the state of the know technology and in accordance with a first aspect of the present disclosure, a power feeder is provided that comprises a power output signal generator, and a controller. The power output signal generator generates a plurality of power output signals of different strengths. The controller performs an increasing or decreasing control to increase or decrease at least one of the strengths of the power output signals based on the strengths of the power output signals at which an electronic device has been detected.

BRIEF DESCRIPTION OF THE DRAWINGS

Referring now to the attached drawings which form a part of this original disclosure.

DETAILED DESCRIPTION OF EMBODIMENTS

Figure 1:
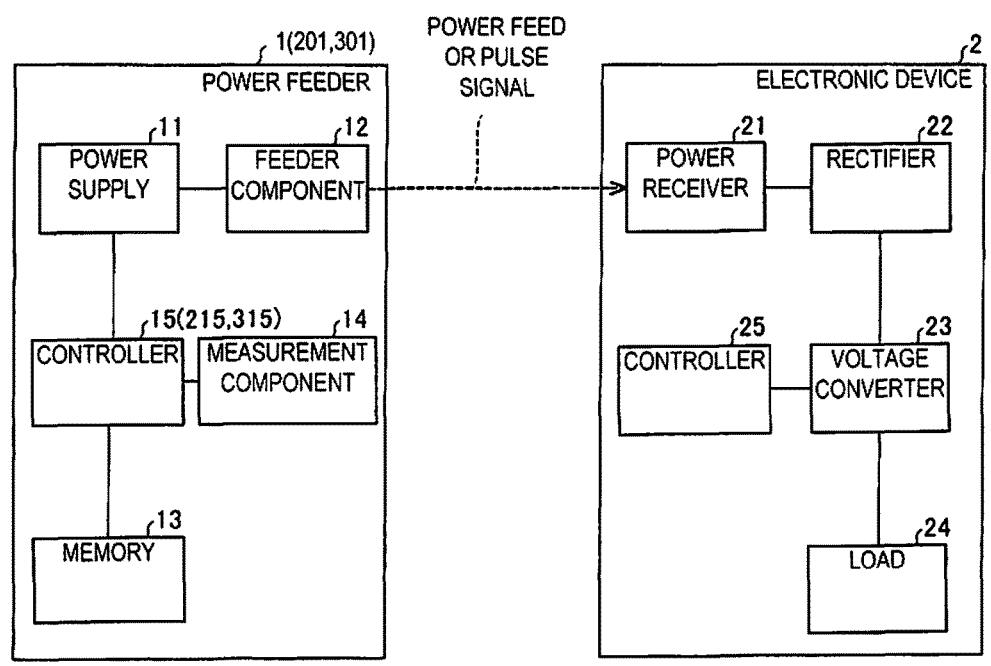
FIG. 1 is a block diagram of the configuration of an electronic device and a power feeder pertaining to a first embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Configuration of Power Feeder

First, the configuration of a power feeder 1 pertaining to a first embodiment will be described through reference to FIG. 1.

The power feeder 1 pertaining to the first embodiment is a non-contact type of power feeder. The non-contact type of power feeder feeds electrical power to an electronic device 2 by magnetic resonance, without the use of any connectors or other such electrical contacts. With the power feeder 1, to detect the electronic device 2 in a standby state other than a power feeding state, pulse signals are periodically generated in a specific sequence (generation) pattern (see FIG. 2 or 3). With this power feeder 1, when the electronic device 2 has been placed on the power feeder 1 that is in the standby state, if the electronic device 2 is detected by the power feeder 1, then power begins to be fed to the electronic device 2 without any electrical contacts by magnetic resonance. This "standby state" is a state in which the electronic device 2 has not been detected, and the feed of power from the power feeder 1 has not yet started. Also, the pulse signals are an example of the "power output signal" of the present invention.

The power feeder 1 includes a power supply 11, a feeder component 12, a memory 13, a measurement component 14, and a controller 15. The feeder component 12 is an example of the "power output signal generator" of the present invention.

The power supply 11 is configured so that AC power is supplied from a commercial power supply (not shown), and the supplied AC power is converted to a specific frequency and supplied to the feeder component 12. The power supply 11 can include a conventional power supply, which is well known in the art, as needed and/or desired. Thus, the detailed description will be omitted for the sake of brevity.

The feeder component 12 includes an antenna coil (not shown) used for power feed. When AC power of a specific frequency is supplied from the power supply 11 to the antenna coil, the feeder component 12 generates a magnetic field for performing power feed to the electronic device 2 without any electrical contacts. The feeder component 12 is also configured to resonate at a resonance frequency that is substantially the same as the specific frequency of the AC power supplied from the power supply 11. Consequently, the power feeder 1 is configured to feed power to the electronic device 2 without any electrical contacts. The feeder component 12 is also configured to generate pulse signals (see FIG. 1) at regular intervals in a standby state. The feeder component 12 or antenna coil can include a conventional feeder component or antenna coil, which is well known in the art, as needed and/or desired. Thus, the detailed description will be omitted for the sake of brevity.

The memory 13 stores detection results for each pulse strength of the pulse signals, and various kinds of program for operating the power feeder 1. The memory 13 can include a conventional memory, which is well known in the art, as needed and/or desired. For example, the memory 13 can include a ROM (Read Only Memory) device and/or a RAM (Random Access Memory) device. The RAM can store statuses of operational flags and various data, such as detection results. The ROM can store control programs for various operations of the controller 15.

The measurement component 14 is configured to measure the impedance of the antenna coil (not shown) of the feeder component 12, and output the measured impedance to the controller 15. The measurement component 14 or antenna coil can include a conventional measurement component or antenna coil, which is well known in the art, as needed and/or desired. Thus, the detailed description will be omitted for the sake of brevity. The controller 15 is configured to determine that the electronic device 2 has been detected based on the amount of change in the impedance of the feeder component 12 acquired from the measurement component 14. For instance, when the electronic device 2 is moved close to the power feeder 1, the impedance of the feeder component 12 rises. This can be utilized by the power feeder 1 to detect the electronic device 2.

The controller 15 is configured to control the various constituent elements of the power feeder 1. For example, the controller 15 performs control to increase or decrease the strength of the pulse signals generated by the feeder component 12 in a specific sequence pattern (see FIG. 4) in order to detect the electronic device 2 in a standby state. The controller 15 includes a CPU (Central Processing Unit), or other processors (microcomputers). The controller 15 can also include other conventional components such as an input interface circuit, an output interface circuit, and storage devices such as an internal ROM device and an internal RAM device. The controller 15 is programmed to control the various component of the power feeder 1. The internal RAM stores statuses of operational flags and various control data. The internal ROM stores the-control programs for various operations. It will be apparent to those skilled in the art from this disclosure that the precise structure and algorithms for controller 15 can be any combination of hardware and software that will carry out the functions of the present invention.

In the first embodiment, the controller 15 is configured to acquire the pulse strength of the pulse signals when the electronic device 2 has been detected in a standby state. With the power feeder 1, the controller 15 performs an increasing or decreasing control to increase or decrease the pulse strength of a plurality of pulse signals of different pulse strengths generated by the feeder component 12 (discussed below) based on the acquired pulse strength. With the controller 15, this increasing or decreasing control can suppress the power consumption of the power feeder 1. The pulse strength is an example of "strength" in the present invention.

This pulse strength includes a maximum output strength P1 (e.g., high output strength) and a low output strength. The pulse strength at the maximum output strength P1 is at its maximum. Here, the pulse strength at its maximum can mean the highest pulse strength that the feeder component 12 (or the power feeder 1) is able to generate or is allowed to generate (e.g., power rating), or the highest pulse strength within a predetermined power range preset for the operation of the feeder component 12 (or the power feeder 1). Also, the pulse strength at the low output strength is lower than at the maximum output strength P1. This low output strength includes a medium output strength P2 and a small output strength P3 with a lower pulse strength than the medium output strength P2. Specifically, there are three types of pulse strength, in decreasing order of strength level: the maximum output strength P1, the medium output strength P2, and the small output strength P3. More precisely, there are 100 levels (L1 to L100) of the pulse strength in a standby state. In the initial state in which the pulse strength is set to its initial setting value (at the start of the increasing or decreasing control), the maximum output strength P1 is set to the highest pulse strength L100, the medium output strength P2 is set to a pulse strength L50, and the small output strength P3 is set to a pulse strength L45. The maximum output strength P1 neither increases nor decreases from the pulse strength L100. In other words, the maximum output strength P1 is maintained to the same during the increasing or decreasing control of the controller 15. The controller 15 performs control (e.g., the increasing or decreasing control) to increase or decrease the pulse strength of the low output strength (the medium output strength P2 and the small output strength P3) based on the detection frequency for each pulse strength of the pulse signals that have been acquired. The detailed configuration of the controller 15 will be discussed below. In the illustrated embodiment, the term "maximum output strength P1" can mean the pulse strength of the pulse signal, or the pulse signal having the maximum output strength itself. Also, the term "medium output strength P2" can mean the pulse strength of the pulse signal, or the pulse signal having the medium output strength itself. Further, the term "small output strength P3" can mean the pulse strength of the pulse signal, or the pulse signal having the small output strength itself.

Configuration of Electronic Device

The configuration of the electronic device 2 will now be described through reference to FIG. 1.

The electronic device 2 is detected by the power feeder 1 when it is disposed at a specific location of the power feeder 1. Examples of the electronic device 2 include a smart phone, a tablet terminal device, and a laptop computer.

The electronic device 2 includes a power receiver 21, a rectifier 22, a voltage converter 23, a load 24, and a controller 25.

The power receiver 21 includes an antenna coil (not shown) for receiving power. The power receiver 21 is configured to resonate at a resonance frequency that is substantially the same as the resonance frequency of the feeder component 12. The power receiver 21 is also configured to generate (receive) AC power when the antenna coil is resonated by magnetic resonance. The power receiver 21 is also configured to output the generated AC power to the rectifier 22.

The rectifier 22 is configured to rectify the AC power generated at the power receiver 21 into DC power. The rectifier 22 is also configured to output the rectified DC power to the voltage converter 23.

The voltage converter 23 is configured to convert the DC power inputted from the rectifier 22 to a specific voltage value, based on control by the controller 25, in order to feed power to the load 24. The voltage converter 23 is also configured to feed the load 24 with the DC power that has been converted to a specific voltage value.

The load 24 is constituted by a rechargeable battery, for example, which is charged by the power feed from the voltage converter 23. Instead of being a rechargeable battery, the load 24 may be configured by a circuit or the like that operates by the feed of power from the voltage converter 23.

The controller 25 is configured to control the various constituent elements of the electronic device 2.

Detailed Configuration of Controller of Power Feeder

The detailed configuration of the controller 15 of the power feeder 1 will now be described through reference to FIGS. 2 to 5. Specifically, the increasing or decreasing control by the controller 15 over the sequence pattern (generation pattern) in the standby state of the power feeder 1 will be described.

Figure 3:
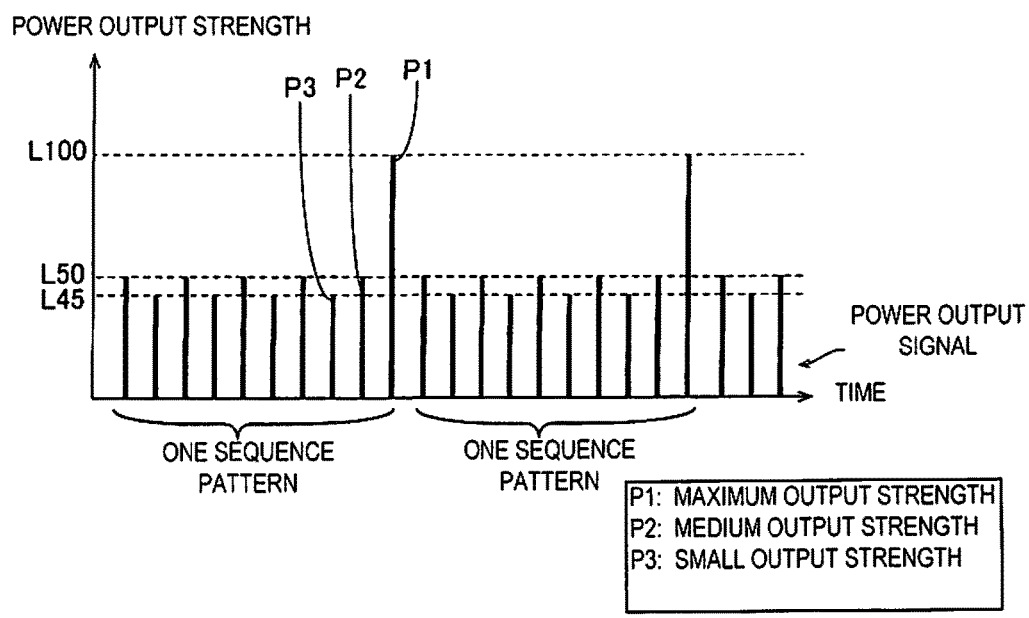
FIG. 3 illustrates a plurality of continuous sequence patterns in the initial state of the power feeder pertaining to the first embodiment.
Figure 4:
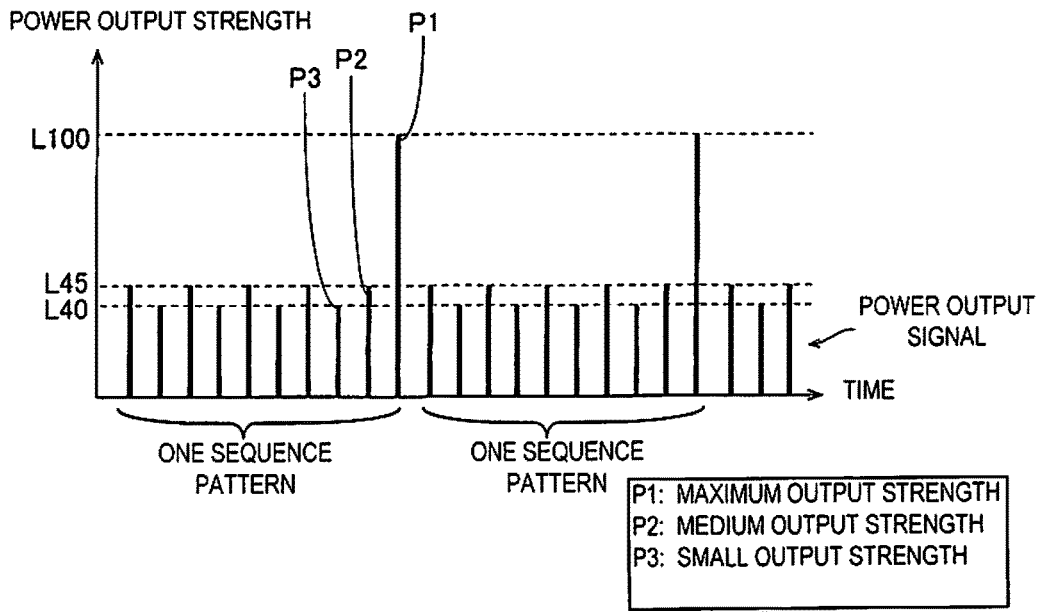
FIG. 4 illustrates a plurality of continuous sequence patterns after an increasing or decreasing control of the power feeder pertaining to the first embodiment.

As shown in FIGS. 3 and 4, the controller 15 executes control in which signals are repeatedly generated in a sequence pattern that includes a plurality of pulse signals of different pulse strengths. The controller 15 is configured to detect the electronic device 2 and to perform the increasing or decreasing control (control to increase or decrease the pulse strength of the pulse signals in the sequence pattern) based on the detection frequency for each pulse strength acquired in the detection of the electronic device 2.

The detection frequency here indicates how many times the maximum output strength P1, the medium output strength P2, and the small output strength P3 each have been detected in the detection results of the electronic device 2 for the last five times (if power feed is performed once a day, then the detection results for the past five days). For instance, the detection frequency is a history indicating that the maximum output strength P1 has been detected once, the medium output strength P2 three times, and the small output strength P3 once in the detection results for the most recent five times. The controller 15 also performs the increasing or decreasing control based on the detection results for the most recent five times stored in the memory 13.

Figure 2:
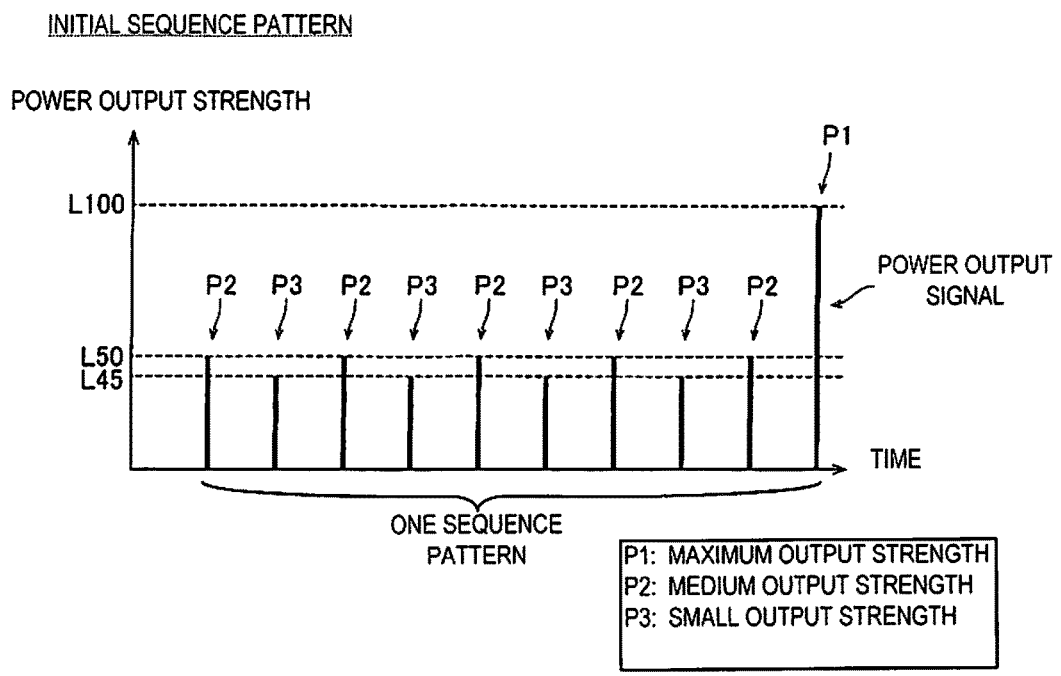
FIG. 2 illustrates one sequence pattern in the initial state of the power feeder pertaining to the first embodiment.

As shown in FIG. 2, one sequence pattern is made up of ten continuously generated pulse signals. These ten pulse signals are made up of one pulse signal of the maximum output strength P1, five pulse signals of the medium output strength P2, and four pulse signals of the small output strength P3. The order in which the ten pulse signals are generated is such that first the pulse signals of the medium output strength P2 and the small output strength P3 are alternately generated for a total of nine continuous times, and finally a pulse signal of the maximum output strength P1 is generated one time.

Figure 5:
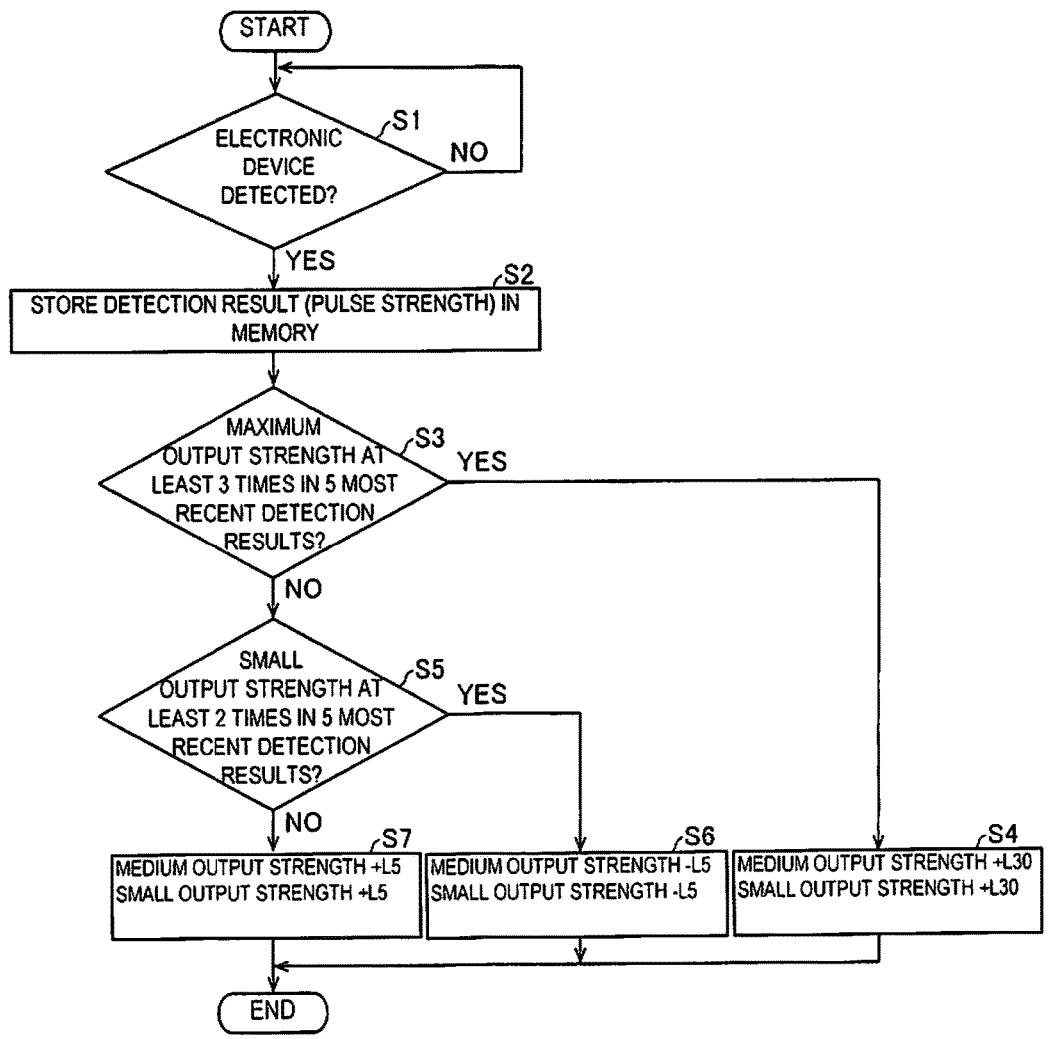
FIG. 5 is a flowchart illustrating processing for the increasing or decreasing control of the power feeder pertaining to the first embodiment.

The controller 15 performs control to increase the pulse strength of the low output strength (the medium output strength P2 and the small output strength P3) by L30 if the detection frequency at the maximum output strength P1 is greater than the detection frequency at the low output strength (the medium output strength P2 and the small output strength P3) in the five most recent detection results (see steps S3 and S4 in FIG. 5). For example, the controller 15 performs control to increase the medium output strength P2 from L50 to L80 and the small output strength P3 from L45 to L75 if the detection frequency (number of times) at the maximum output strength P1 is 3 or more times in the five most recent detection results.

Meanwhile, the controller 15 performs control to increase or decrease the pulse strength of the low output strength (the medium output strength P2 and the small output strength P3) by L5 if the detection frequency at the maximum output strength P1 is less than the detection frequency at the low output strength (the medium output strength P2 and the small output strength P3) (if the detection frequency (the number of times) at the maximum output strength P1 is less than 3 times) in the five most recent detection results (see steps S3 and S5 to S7 in FIG. 5).

More precisely, the controller 15 performs control to decrease the pulse strength of the medium output strength P2 and the small output strength P3 by L5 if the detection frequency at the maximum output strength P1 is less than the detection frequency at the low output strength (the medium output strength P2 and the small output strength P3) and if the detection frequency at the small output strength P3 is at least a specific detection frequency, in the five most recent detection results (see steps S3, S5, and S6 in FIG. 5).

Meanwhile, the controller 15 performs control to increase the pulse strength of the medium output strength P2 and the small output strength P3 by L5 if the detection frequency at the maximum output strength P1 is less than the detection frequency at the low output strength (the medium output strength P2 and the small output strength P3) and if the detection frequency at the small output strength P3 is less than a specific detection frequency, in the five most recent detection results (see steps S3, S5, and S7 in FIG. 5).

More specifically, the controller 15 performs control to decrease the pulse strength of the medium output strength P2 and the small output strength P3 by L5 if the detection frequency (number of times) at the maximum output strength P1 is less than three times and the detection frequency (number of times) at the small output strength P3 is at least two times.

Meanwhile, the controller 15 performs control to increase the pulse strength of the medium output strength P2 and the small output strength P3 by L5 if the detection frequency (number of times) at the maximum output strength P1 is less than three times and the detection frequency (number of times) at the small output strength P3 is less than two times.

Increasing or Decreasing Control Processing of Controller

The increasing or decreasing control processing performed by the controller 15 of the power feeder 1 will now be described through reference to the flowchart in FIG. 5.

First, in step S1, the controller 15 (see FIG. 1) determines whether or not the electronic device 2 has been detected by repeating a set sequence pattern (see FIGS. 2 and 3). More specifically, whether or not the electronic device 2 (see FIG. 1) has been detected is determined based on the amount of change in the impedance of the feeder component 12 (see FIG. 1) acquired from the measurement component 14 (see FIG. 1). If no electronic device 2 has been detected, the processing of step S1 is repeated. If it is determined that the electronic device 2 has been detected, the flow proceeds to step S2.

In step S2, the controller 15 stores the pulse strength at the point when the electronic device 2 has been detected in the memory 13. More specifically, information indicating whether the electronic device 2 has been detected by the maximum output strength P1, the medium output strength P2, or the small output strength P3 is stored in the memory 13.

At this point, the pulse strengths for the past five detections must be stored in the memory 13. If the number of past detections is less than five, dummy detection results are produced. Then, pulse strengths for the past five detections are considered to have been stored in the memory 13. For example, if the detection results for the past three times are the small output strength P3, the medium output strength P2, and the small output strength P3 in the order starting from the most recent detection result, then the detection results for the remaining two times may be considered to be the same as the detection results for the most recent two times (the small output strength P3 and the medium output strength P2). After the detection results have been stored in the memory 13, the flow proceeds to step S3.

In step S3, the controller 15 determines whether or not the maximum output strength P1 has been detected at least three times in the five most recent detection results. If the maximum output strength P1 has been detected at least three times, then the flow proceeds to step S4. For example, the flow proceeds to step S4 if the maximum output strength P1, the maximum output strength P1, the medium output strength P2, the maximum output strength P1, and the medium output strength P2 have been detected in the order in the five most recent detection results.

In step S4, the controller 15 increases both the medium output strength P2 and the small output strength P3 by L30. For example, at a point prior to proceeding to step S4, if the medium output strength P2 is L50 and the small output strength P3 is L45, then the medium output strength P2 is increased to L80 and the small output strength P3 to L75.

In step S3, if the maximum output strength P1 has been detected less than three times, the flow proceeds to step S5. Then, in step S5, the controller 15 determines whether or not the small output strength P3 has been detected at least two times in the five most recent detection results. If the small output strength P3 has been detected at least two times, then the flow proceeds to step S6. Then, in step S6, the controller 15 decreases both the medium output strength P2 and the small output strength P3 by L5.

In step S5, the flow proceeds to step S7 if the small output strength P3 has been detected less than two times. Then, in step S7, the controller 15 increases both the medium output strength P2 and the small output strength P3 by L5.

The increasing or decreasing control processing by the controller 15 is ended when the medium output strength P2 and the small output strength P3 are both increased or decreased in step S4, S6, or S7.

If the initial setting values for the medium output strength P2 and the small output strength P3 are set to relatively high values that allow the electronic device 2 to be detected more or less reliably, then as long as the electronic device 2 is placed within a specific location range with respect to the power feeder 1, and the same electronic device 2 (including the same type of electronic device 2) is used, it will almost never happen that the maximum output strength P1 is detected three or more times in the five most recent detections. Specifically, in this case, the flow will almost never proceed to step S4. Also, while the above-mentioned flow is being repeated during power feed day after day, if step S6 is repeated, the medium output strength P2 and the small output strength P3 will both gradually decrease (by the pulse strength L5 at a time). If the medium output strength P2 and the small output strength P3 have decreased too much, in step S1, the medium output strength P2 and the small output strength P3 can both be increased a little at a time (by the pulse strength L5). Thereafter, control is repeated to alternately increase or decrease the medium output strength P2 and the small output strength P3 a little at a time (fine tuning).

Specifically, when the increasing or decreasing control is repeated in the above flow, the small output strength P3 is set to near the lower limit of the pulse strength at which the electronic device 2 can be detected. The minimum required pulse strength setting is then maintained, in which the medium output strength P2 is set to a pulse strength that is slightly above the small output strength P3 at which the electronic device 2 can be detected more or less reliably. As a result, it is possible to maintain a state in which power consumption can be suppressed in the standby state of the power feeder 1.

Effect of First Embodiment

The following effect can be obtained with the first embodiment.

As discussed above, in the first embodiment, the controller 15 is provided to perform the increasing or decreasing control to increase or decrease at least one pulse strength of a plurality of pulse signals with different pulse strengths generated by the feeder component 12, based on the pulse strength of the pulse signal at which the electronic device 2 has been detected. Consequently, when the initial pulse strength is set relatively high, at least one pulse strength of the plurality of pulse signals generated from the feeder component 12 can be decreased by the controller 15, without lengthening the generation interval of the pulse signals as in the conventional technique. As a result, this avoids the problem whereby the user thinks there is a malfunction, which happens as a result of lengthening the interval at which the pulse signals are generated. Thus, power consumption in a standby state can be suppressed without compromising user convenience. Furthermore, if the pulse strength has been decreased too much, then it can be increased again. Thus, a pulse strength that has been decreased too much can be fine-tuned, etc.

Also, in the first embodiment, as discussed above, the memory 13 is provided to store detection results for each pulse strength of the pulse signals. The controller 15 performs the increasing or decreasing control based on a specific number of the most recent detection results stored in the memory 13. Here, there may be situations in which a change of the electronic device 2 being used causes a detection result that is different from a past detection result to be suddenly obtained. With situations such as this in mind, in the present invention, the increasing or decreasing control is performed based on a specific number of the most recent detection results stored in the memory 13, which have a higher reliability (influence). Consequently, the increasing or decreasing control can be performed more accurately. As a result, power consumption in a standby state can be suppressed without compromising user convenience.

Also, in the first embodiment, as discussed above, the controller 15 detects the electronic device 2 while repeatedly generating a sequence pattern that includes a plurality of pulse signals of different pulse strength. The controller 15 also performs the increasing or decreasing control based on the detection frequency for each pulse strength at which the electronic device 2 has been detected. Consequently, the controller 15 performs the increasing or decreasing control based on the detection frequency in a repeating sequence pattern. Thus, the increasing or decreasing control can be performed according to various kinds of situation, such as being able to change the detection frequency (probability) of each pulse strength (the maximum output strength P1, the medium output strength P2, and the small output strength P3) by varying the initial setting value for the pulse strength or the number of the pulse signals included in the sequence pattern.

Also, in the first embodiment, as discussed above, the pulse strength is provided with the maximum output strength P1 at which the pulse strength is highest and the low output strength (the medium output strength P2 and the small output strength P3) at which the pulse strength is lower than the maximum output strength P1. The controller 15 performs control to increase or decrease the pulse strength of the low output strength based on the detection frequency for each pulse strength of the acquired pulse signals. Consequently, if the pulse strength of the maximum output strength P1 is set to a pulse strength that can be detected by a variety of electronic devices 2, then power consumption in a standby state can be suppressed by means of the increasing or decreasing control for the pulse signal of the low output strength while preventing a situation in which an electronic device is not detected by means of the maximum output strength.

Also, in the first embodiment, as discussed above, the sequence pattern includes one maximum output strength P1. Consequently, a situation in which the electronic device 2 is not detected can be prevented while suppressing power consumption in a standby state compared to when the sequence pattern includes a plurality of pulse signals of the maximum output strength P1.

Also, in the first embodiment, as discussed above, at the detection frequency for a plurality of the most recent instances, the controller 15 performs control to increase the pulse strength of the low output strength (the medium output strength P2 and the small output strength P3) by L30 if the detection frequency at the maximum output strength P1 is greater than the detection frequency at the low output strength. Also, the controller 15 performs control to increase or decrease the pulse strength of the low output strength by L5 if the detection frequency at the maximum output strength P1 is less than the detection frequency at the low output strength. Consequently, at the detection frequency for a plurality of the most recent instances, if the detection frequency at the maximum output strength P1 is greater than the detection frequency at the low output strength, that is, if the low output strength is too low (or is decreased too much) and is difficult to detect, then the pulse strength can be increased. Consequently, the pulse signal can be detected by both the maximum output strength P1 and the low output strength. Thus, the electronic device 2 can be detected faster than when the pulse signal can be detected only by the maximum output strength P1. As a result, user convenience can be enhanced.

Also, in the first embodiment, as discussed above, the controller 15 performs control to decrease the pulse strength of the medium output strength P2 and the small output strength P3 by L5 if the detection frequency at the maximum output strength P1 is less than the detection frequency at the low output strength (the medium output strength P2 and the small output strength P3) and if the detection frequency at the small output strength P3 is at least a specific detection frequency. Also, the controller 15 performs control to increase the pulse strength of the medium output strength P2 and the small output strength P3 by L5 if the detection frequency at the maximum output strength P1 is less than the detection frequency at the low output strength and if the detection frequency at the small output strength P3 is less than a specific detection frequency. Consequently, the pulse strength of the medium output strength P2 and the small output strength P3 is decreased if there are many detections by the small output strength P3. Thus, power consumption can be suppressed by gradually decreasing the power consumption by any extra pulse strength at which an electronic device 2 can be detected. Also, if many detections result from the medium output strength P2 that is closer to the maximum output strength P1 than the small output strength P3, the maximum output strength P1 will result in more detections than when the small output strength P3 results in many detections. Here, for reducing detections by the maximum output strength P1, and for increasing detections by the small output strength P3, the pulse strength of the medium output strength P2 and the small output strength P3 is increased by L5 (a relatively small value that is less than L30). Along with this, the number of detections resulting from the maximum output strength P1 declines. Thus, an increase by L30 (a relatively large value) in the medium output strength P2 and the small output strength P3 (a relatively large increase in power consumption) can be suppressed.

Second Embodiment

Figure 6:
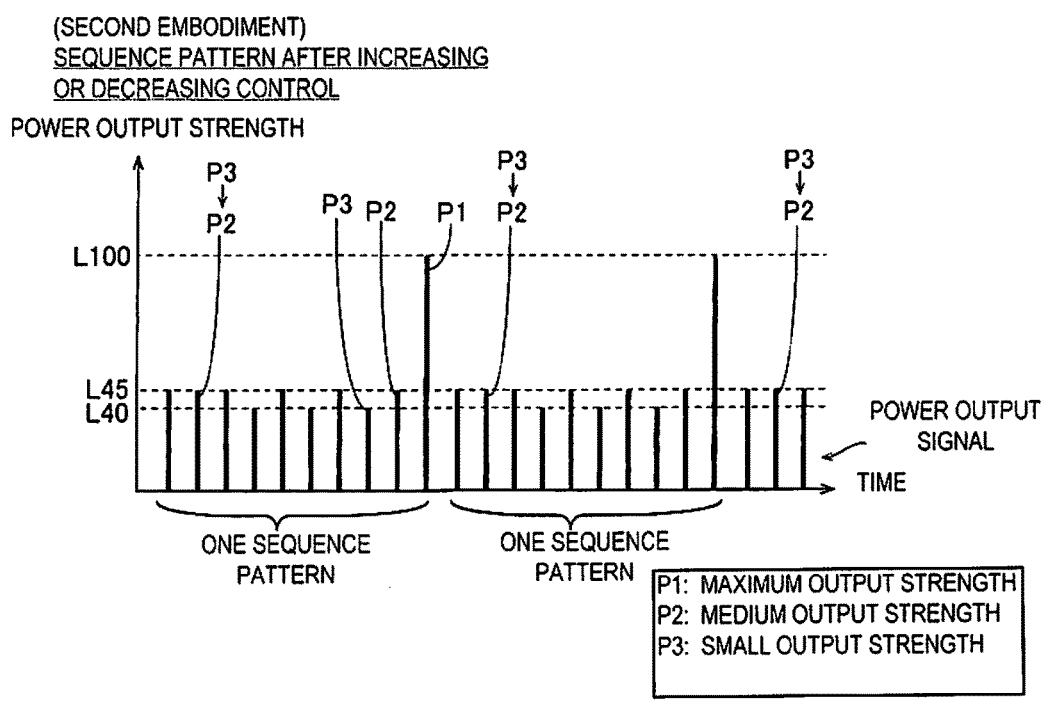
FIG. 6 illustrates a plurality of continuous sequence patterns after an increasing or decreasing control of the power feeder pertaining to a second embodiment.
Figure 7:
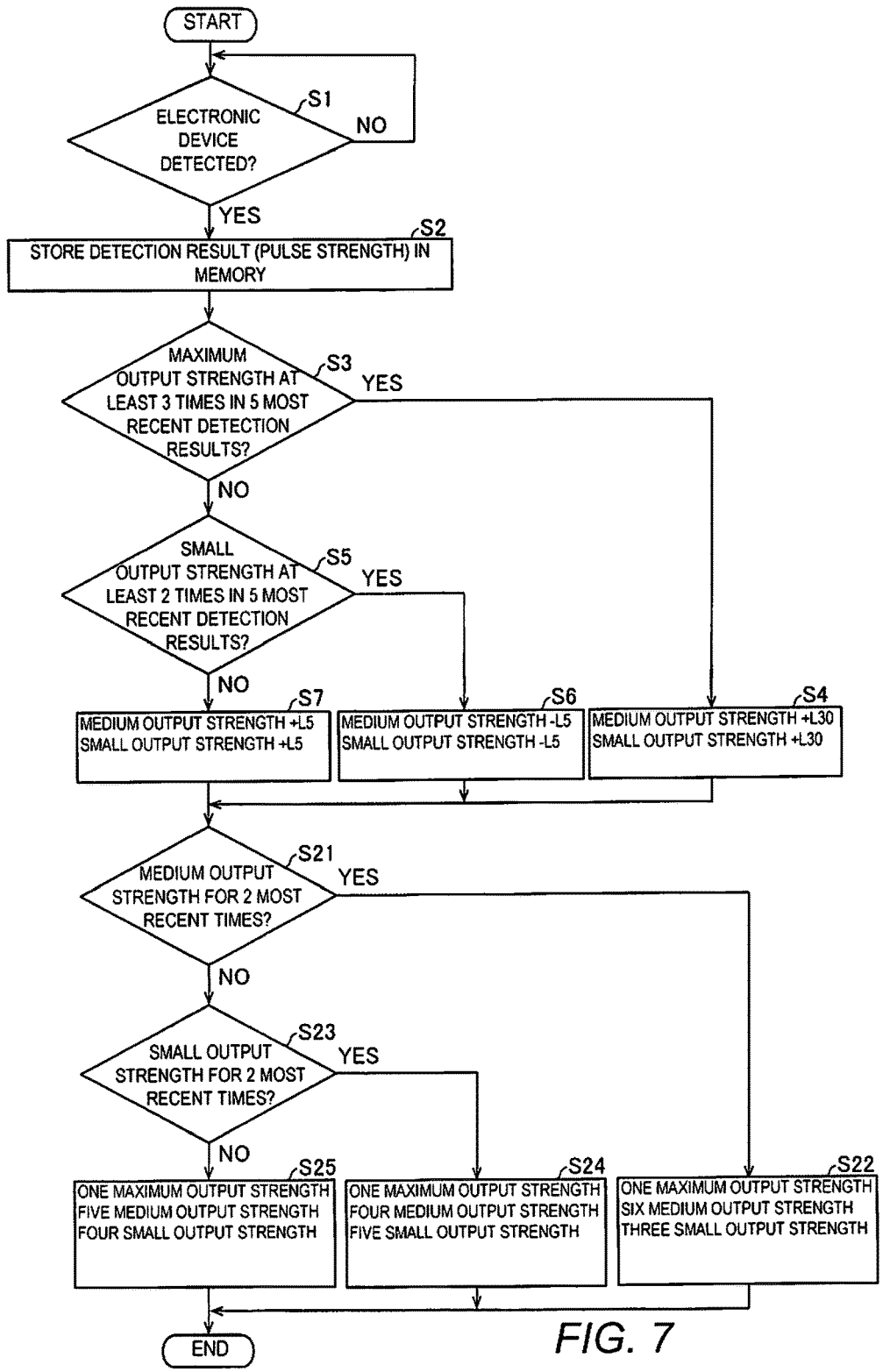
FIG. 7 is a flowchart illustrating processing for the increasing or decreasing control of the power feeder pertaining to the second embodiment.

Referring now to FIGS. 1, 6 and 7, a power feeder 201 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In this second embodiment, a controller 215 increases or decreases the number of medium output strengths P2 and small output strengths P3 in one sequence pattern, in addition to the configuration of the first embodiment above in which the controller 15 increases or decreases the pulse strength of the medium output strength P2 and the small output strength P3.

Configuration of Power Feeder

As shown in FIG. 6, with the power feeder 201 pertaining to the second embodiment (see FIG. 1), the controller 215 performs control to increase or decrease the number of pulse signals of the medium output strength P2 and the small output strength P3 included in a sequence pattern, based on the two most recent detection results for each pulse strength of the pulse signals.

More specifically, let us consider a case in which the number of maximum output strength P1 is one, the number of medium output strengths P2 is five, and the number of small output strengths P3 is fourth in a single sequence pattern. The controller 215 performs control (see FIG. 6) to set the number of medium output strengths P2 in a sequence pattern composed of ten pulse signals to a total of six, and the number of small output strengths P3 to a total of three when the electronic device 2 has been detected by the medium output strength P2 for the two most recent instances consecutively (see steps S21 and S22 in FIG. 7).

Also, the controller 215 performs control to set the number of medium output strengths P2 in a sequence pattern composed of ten pulse signals to a total of four, and the number of small output strengths P3 to a total of five when the electronic device 2 has been detected by the small output strength P3 for the two most recent instances consecutively (see steps S23 and S24 in FIG. 7).

Also, the controller 215 performs control to maintain the number of medium output strengths P2 at a total of five and the number of small output strengths P3 at a total of four when no electronic device 2 has been detected by the medium output strength P2 or the small output strength P3 for the two most recent instances consecutively (see steps S21, S23, and S25 in FIG. 7). In any case, the number of pulse signals of the maximum output strength P1 remains unchanged at one. The number of pulse signals included in a sequence pattern may be one of the three different scenarios in which there are one maximum output strength P1, five medium output strengths P2, and four small output strengths P3 (in the initial state), or one, six, and three of these, respectively, or one, four, and five.

Increasing or Decreasing Control Processing of Controller

Next, a flowchart will be used to describe the increasing or decreasing control processing performed by the controller 215 of the power feeder 201, through reference to FIG. 7. Steps S1 to S7 are the same as in the first embodiment, and therefore will not be described again. The description will be of steps S21 to S25 that follow step S7.

First, in step S21, the controller 215 (see FIG. 1) determines whether or not the electronic device 2 has been detected by the medium output strength P2 for the two most recent consecutive times. If the electronic device 2 has been detected by the medium output strength P2 two times in a row, then the flow proceeds to step S22. Then, in step S22, the controller 215 changes the number of medium output strengths P2 in the sequence pattern to a total of six, and the number of small output strengths P3 to a total of three.

In step S21, if no electronic device 2 has been detected by the medium output strength P2 two times in a row, the flow proceeds to step S23. Then, in step S23, the controller 215 determines whether or not the electronic device 2 has been detected by the small output strength P3 for the two most recent consecutive times. If the electronic device 2 has been detected by the small output strength P3 two times in a row, the flow proceeds to step S24.

Then, in step S24, the controller 215 changes the number of medium output strengths P2 in the sequence pattern to a total of four, and changes the number of small output strengths P3 to a total of five.

Also, in step S23, if the electronic device 2 has been detected by the small output strength P3 for the two most recent consecutive times, the flow proceeds to step S25. Then, in step S25, the controller 215 sets (changes) the number of medium output strengths P2 to a total of five, and the number of small output strengths P3 to a total of four (initial setting).

Then, in steps S22, S24, and S25, the number of medium output strengths P2 and small output strengths P3 is increased, decreased, etc., to end the increasing or decreasing control processing done by the controller 215.

Effect of Second Embodiment

The following effect can be obtained with the second embodiment.

In the second embodiment, just as in the first embodiment above, the controller 215 is provided to perform the increasing or decreasing control to increase or decrease at least one of the pulse strengths of a plurality of pulse signals of different pulse strengths generated by the feeder component 12, based on the pulse strength of the pulse signal at which the electronic device 2 has been detected. This allows power consumption in a standby state to be suppressed without compromising user convenience.

Also, in the second embodiment, as discussed above, if the electronic device 2 is detected by the medium output strength P2 for the two most recent consecutive times in the five most recent detection results for each of the pulse strengths of the pulse signals, then the controller 215 increases the number of medium output strengths P2 in the sequence pattern and decreases the number of small output strengths P3. Also, if the electronic device 2 is detected by the small output strength P3 for the two most recent consecutive times, then the controller 215 decreases the number of medium output strengths P2 in the sequence pattern and increases the number of small output strengths P3. Consequently, when the medium output strength P2 is detected consecutively most recently (when it is likely that the maximum output strength P1 will be detected), the number of medium output strengths P2 in the sequence pattern can be increased. Thus, the pulse strength can be increased more reliably than before increasing the number of the medium output strengths P2. Also, if the small output strength P3 is detected consecutively most recently (if the medium output strength P2 and the small output strength P3 are apart from the lowest pulse strength at which the electronic device 2 can actually be detected), the number of small output strengths P3 in the sequence pattern can be increased. Thus, there will be more pulses of low strength than before increasing the number of small output strengths P3, and the average pulse strength per unit of time can be decreased.

Third Embodiment

Figure 8:
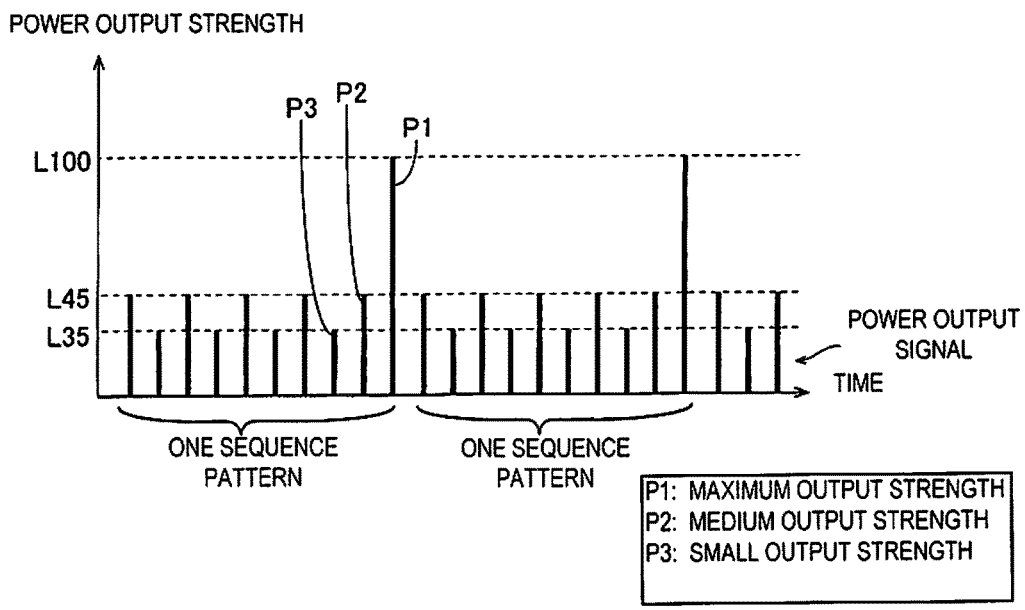
FIG. 8 illustrates a plurality of continuous sequence patterns after an increasing or decreasing control of the power feeder pertaining to a third embodiment.
Figure 9:
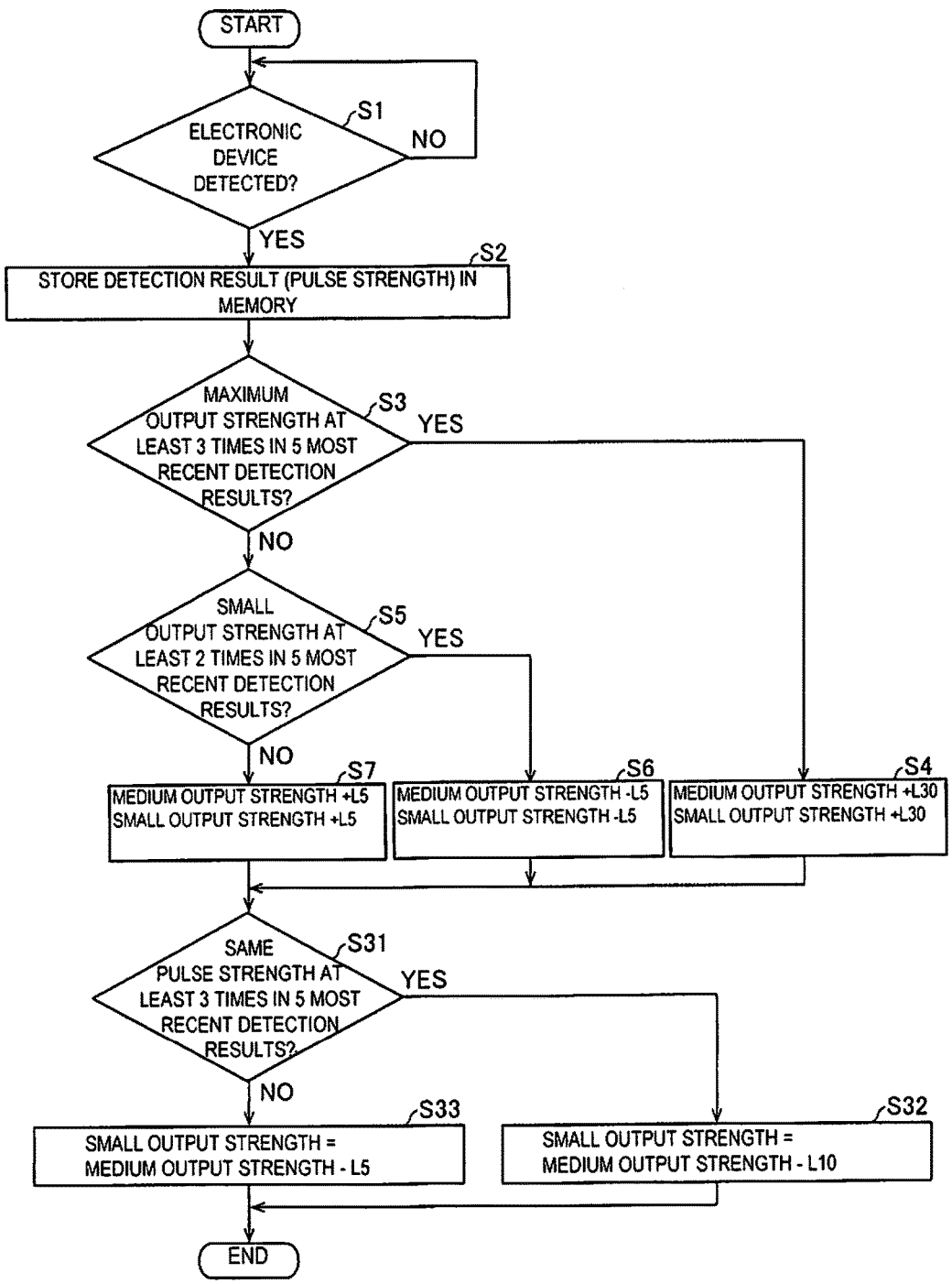
FIG. 9 is a flowchart illustrating processing for the increasing or decreasing control of the power feeder pertaining to the third embodiment.

Referring now to FIGS. 1, 8 and 9, a power feeder 301 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. In this third embodiment, the pulse strength of the small output strength P3 is changed by a controller 315 with respect to the medium output strength P2 in one sequence pattern, in addition to the configuration in the first embodiment above, in which the pulse strength of the medium output strength P2 and the small output strength P3 is increased or decreased by the controller 15.

Configuration of Power Feeder

As shown in FIG. 8, with the power feeder 301 (see FIG. 1) pertaining to the third embodiment, the controller 315 performs control to change the pulse strength of the small output strength P3 with respect to the medium output strength P2 based on the detection results for each pulse strength of the five most recent pulse signals.

More specifically, the controller 315 performs control (see FIG. 8) to expand the difference in pulse strength between the medium output strength P2 and the small output strength P3 from L5 to L10 by reducing the pulse strength of the small output strength P3 when either the maximum output strength P1, the medium output strength P2, or the small output strength P3 has been detected three or more times in the five most recent detection results (see steps S31 and S32 in FIG. 9).

Also, the controller 315 performs control to set the difference in pulse strength between the medium output strength P2 and the small output strength P3 to L5 (initial setting) when either the maximum output strength P1, the medium output strength P2, or the small output strength P3 has been detected three or more times in the five most recent detection results (see steps S31 and S33 in FIG. 9).

Increasing or Decreasing Control Processing of Controller

The increasing or decreasing control processing performed by the controller 315 of the power feeder 301 will now be described through reference to the flowchart in FIG. 9. Steps S1 to S7 are the same as in the first embodiment, and therefore will not be described again. The description will be of steps S31 to S33 that follow step S7.

First, in step S31, the controller 315 (see FIG. 1) determines whether or not one pulse strength has been detected three or more times for the five most recent detection results. If one pulse strength has been detected three or more times, then the flow proceeds to step S32.

Then, in step S32, the controller 315 sets the pulse strength of the small output strength P3 to the medium output strength P2-10. For example, if the pulse strength of the medium output strength P2 is L50 and the pulse strength of the small output strength P3 is L45, in step S32 the pulse strength of the small output strength P3 is set to L40.

Also, in step S31, if one pulse strength has not been detected three or more times, then the flow proceeds to step S33. Then, in step S33, the controller 315 sets the difference in the pulse strength between the medium output strength P2 and the small output strength P3 to L5 (the initial setting).

In step S32 or S33, the increasing or decreasing control processing performed by the controller 315 is ended when the difference in the pulse strength between the medium output strength P2 and the small output strength P3 has been changed, etc.

Effect of Third Embodiment

The following effect can be obtained with the third embodiment.

With the third embodiment, just as with the first embodiment above, the controller 315 is provided to perform the increasing or decreasing control to increase or decrease at least one pulse strength of a plurality of pulse signals with different pulse strengths generated by the feeder component 12, based on the pulse strength of the pulse signal at which the electronic device 2 has been detected. Consequently, power consumption in a standby state can be suppressed without compromising user convenience.

Also, with the third embodiment, as discussed above, if any one pulse strength has been detected three or more times in the five most recent detection results for each pulse strength of the pulse signals, then the controller 315 expands the difference in pulse strength between the medium output strength P2 and the small output strength P3. Furthermore, if all of the pulse strengths have been detected fewer than three times, then the controller 315 performs control to set the pulse strength of the medium output strength P2 and the small output strength P3 to a specific initial setting. When the location of the electronic device 2 with respect to the power feeder 301 is not consistent from one power feed to the next, the pulse strength required to detect the electronic device 2 may have a displacement range that is greater than the difference between the medium output strength P2 and the small output strength P1 (the initial setting of L5). This large displacement range can sometimes cause the pulse strength to fluctuate greatly, without being stabilized by the increasing or decreasing control. As a result, the maximum output strength P1 and the small output strength P3 will be particularly prone to being detected. In view of this, when the above configuration is employed, if, in a plurality number of the most recent detection results, the number of times a single pulse strength (and particularly the small output strength P3 or the maximum output strength P1) is detected is at least half of the plurality number, then the difference between the medium output strength P2 and the small output strength P3 can be expanded by L5 (less than L30) in order to produce more detections by the medium output strength P2. With this configuration, when the increasing or decreasing control such as this is performed, it is suppressed that a state in which there are more detections by the small output strength P3 is instantly changed to a state in which there are more detections by the maximum output strength P1, etc. As a result, there is better control over reducing power consumption in a standby state, and more stable control can be realized.

Modification Examples

The embodiments disclosed herein are merely examples in all respects, and should not be considered limiting in nature. The scope of the invention being indicated by the appended claims rather than by the above description of the embodiments, all modifications (modification examples) within the meaning and range of equivalency of the claims are included.

In the first to third embodiments above, the sequence pattern includes the maximum output strength, but the present invention is not limited to this. The present invention may be such that the sequence pattern does not include the maximum output strength.

In the first to third embodiments above, the sequence pattern includes just one maximum output strength, but the present invention is not limited to this. The present invention may be such that the sequence pattern includes two or more maximum output strengths.

In the first to third embodiments above, the sequence pattern is made up of three types of pulse strength, namely, the maximum output strength, the medium output strength, and the small output strength, but the present invention is not limited to this. The present invention may be such that the sequence pattern is made up of two types or four or more types of pulse strength.

In the first to third embodiments above, the controller performs the increasing or decreasing control processing based on the five most recent detection results, but the present invention is not limited to this. The present invention may be such that the increasing or decreasing control processing based on a number of detection results that is other than five.

In the first to third embodiments above, the difference in pulse strength between the medium output strength and the small output strength is set to L5 in the initial setting, but the present invention is not limited to this. The present invention may be such that the difference in pulse strength between the medium output strength and the small output strength is set to a value other than L5.

In the first to third embodiments above, the pulse strength (L50) of the medium output strength is set to one-half the pulse strength of the maximum output strength (L100), but the present invention is not limited to this. The present invention may be such that the pulse strength of the medium output strength is set to a value other than one-half of the pulse strength (L100) of the maximum output strength.

In the first to third embodiments above, the pulse strength is increased by L30, increased by L5, or decreased by L5, but the present invention is not limited to this. The present invention may be such that the pulse strength is increased or decreased by some value other than those given above.

In the first to third embodiments above, the pulse signal is generated at regular intervals from a feeder component, as an example of the power output signal of the present invention, but the present invention is not limited to this. The present invention may be such that signals are generated continuously from the feeder component, as an example of the power output signal.

In the first to third embodiments above, the power is fed from the power feeder to the electronic device by magnetic resonance, but the present invention is not limited to this. The present invention may be such that power is fed from the power feeder to the electronic device by some method other than magnetic resonance. For instance, power may be fed from the power feeder to the electronic device by means of radio waves, electromagnetic inductions, electric field couplings or the like.

In the first to third embodiments above, for the sake of description, a flow driven type of flowchart is used in which the processing of the controller of the power feeder of the present invention is performed in order according to the processing flow, but the present invention is not limited to this. With the present invention, the processing operation of the controller may be performed by an event driven type of processing in which processing is executed for each event. In this case, the processing may be completely event driven, or may entail a combination of event driven and flow driven.

[1] In view of the state of the know technology and in accordance with a first aspect of the present invention, a power feeder is provided that comprises a power output signal generator, and a controller. The power output signal generator is configured to generate a plurality of power output signals of different strengths. The controller is configured to perform an increasing or decreasing control to increase or decrease at least one of the strengths of the power output signals based on the strengths of the power output signals at which an electronic device has been detected.

With this configuration, as mentioned above, the controller is configured to perform the increasing or decreasing control to increase or decrease at least one of the strengths of the power output signals of different strengths generated by the power output signal generator, based on the strengths of the power output signal at which the electronic device has been detected. Consequently, if the initial strength is set relatively high, the at least one of the strengths of the power output signals generated from the power output signal generator can be reduced by the controller, without lengthening the interval at which the power output signals are generated as in the conventional method. As a result, the user will not worry that there has been a malfunction or the like, which can occur when the interval at which the power output signals are generated is lengthened. Thus, power consumption in a standby state can be suppressed without compromising user convenience. Furthermore, if the strength should be decreased too much, then it can be increased again. Thus, the strength that has been decreased too much can be fine-tuned, etc.

[2] In accordance with a preferred embodiment according to the power feeder mentioned above, the power feeder further comprises a memory. The memory is configured to store detection results for the strengths of the power output signals, respectively. The controller is configured to perform the increasing or decreasing control based on a specific number of the most recent detection results stored in the memory.

When the electronic device being used is changed, this can sometimes suddenly cause a detection result to be obtained that differs from a past detection result. Taking such a case into account, with the present invention, the increasing or decreasing control can be performed more accurately by performing the increasing or decreasing control based on the specific number of the most recent detection results stored in the memory, which have a higher reliability (influence). As a result, power consumption in a standby state can be suppressed without compromising user convenience.

[3] In accordance with a preferred embodiment according to any one of the power feeders mentioned above, the controller is configured to detect the electronic device while repeatedly generating a sequence pattern including the power output signals, and perform the increasing or decreasing control based on detection frequency for each of the strengths at which the electronic device has been detected.

With this configuration, the controller performs the increasing or decreasing control based on the detection frequency within a repeating sequence pattern. Thus, the increasing or decreasing control can be performed according to various kinds of situation, such as being able to change the detection frequency (probability) of each strength by varying the initial strength setting or the number of power output signals included in the sequence pattern.

[4] In accordance with a preferred embodiment according to any one of the power feeders mentioned above, the strengths include a high output strength, and a low output strength that is smaller than the high output strength.

[5] In accordance with a preferred embodiment according to any one of the power feeders mentioned above, the controller is configured to perform the increasing or decreasing control to increase or decrease the low output strength based on the detection frequency for each of the strengths of the power output signals.

With these configurations, if the high output strength is set to a strength that can be detected by a variety of electronic devices, then power consumption in a standby state can be suppressed while preventing a situation in which no electronic device is detected by the high output strength, by means of the increasing or decreasing control of the power output signals of the low output strength.

[6] In accordance with a preferred embodiment according to any one of the power feeders mentioned above, the sequence pattern includes one power output signal of the high output strength.

With this configuration, a situation in which no electronic device is detected can be prevented, and power consumption in a standby state can be suppressed better than when the sequence pattern includes a plurality of power output signals of the high output strength.

[7] In accordance with a preferred embodiment according to any one of the power feeders mentioned above, the controller is configured to increase the low output strength by a first value if the detection frequency at the high output strength is greater than the detection frequency at the low output strength for a plurality number of the most recent detection results.

[8] In accordance with a preferred embodiment according to any one of the power feeders mentioned above, the controller is configured to increase or decrease the low output strength by a value that is less than the first value if the detection frequency at the high output strength is less than the detection frequency at the low output strength for the plurality number of the most recent detection results.

With these configurations, the strength can be increased when the detection frequency at the high output strength is higher than the detection frequency at the low output strength for the plurality number of the most recent detection results, that is, when the low output strength is too low (or has been decreased too much) and is difficult to detect. Consequently, the electronic device can be detected by both the high output strength and the low output strength. Thus, the electronic device can be detected faster than when the electronic device can be detected by only the high output strength. As a result, user convenience can be enhanced.

[9] In accordance with a preferred embodiment according to any one of the power feeders mentioned above, the low output strength has a medium output strength, and a small output strength that is smaller than the medium output strength.

[10] In accordance with a preferred embodiment according to any one of the power feeders mentioned above, the controller is configured to decrease the medium output strength and the small output strength by a value that is less than the first value if the detection frequency at the high output strength is less than the detection frequency at the low output strength, and if the detection frequency at the small output strength is at least a specific detection frequency.

[11] In accordance with a preferred embodiment according to any one of the power feeders mentioned above, the controller is configured to increase the medium output strength and the small output strength by a value that is less than the first value if the detection frequency at the high output strength is less than the detection frequency at the low output strength, and if the detection frequency at the small output strength is less than a specific detection frequency.

With these configurations, if there are many detections that result from the small output strength, then the pulse strengths of the medium output strength and the small output strength will be reduced. Thus, power consumption can be suppressed by gradually decreasing power consumption by any extra strength at which the electronic device can be detected. Also, if there are many detections that result from the medium output strength that is closer to the high output strength than the small output strength, then there are more detections that result from the high output strength than when there are many detections that result from the small output strength. Here, for reducing detection by the maximum output strength, and for increasing detection by the small output strength, the pulse strengths of the medium output strength and the small output strength are increased by a value that is less than the first value (that is, a relatively small value). Along with this, the number of detections resulting from the high output strength declines. Thus, an increase by the first value (a relatively large value) in the medium output strength and the small output strength can be suppressed (a relatively large increase in power consumption can be suppressed).

[12] In accordance with a preferred embodiment according to any one of the power feeders mentioned above, the controller is configured to increase or decrease at least one of the number of the power output signals of the medium output strength and the number of the power output signals of the small output strength based on a plurality number of the most recent detection results.

[13] In accordance with a preferred embodiment according to any one of the power feeders mentioned above, the controller is configured to increase the number of the power output signals of the medium output strength and decrease the number of the power output signals of the small output strength in the sequence pattern if the electronic device has been detected by the power output signals of the medium output strength consecutively for a specific number, which is at least two, of the most recent detection results.

[14] In accordance with a preferred embodiment according to any one of the power feeders mentioned above, the controller is configured to decrease the number of the power output signals of the medium output strength and increase the number of the power output signals of the small output strengths in the sequence pattern if the electronic device has been detected by the power output signals of the small output strength consecutively for a specific number, which is at least two, of the most recent detection results.

With these configurations, if the electronic device has been detected continuously most recently by the power output signals of the medium output strength (or if the electronic device tends to be detected by the power output signals of the high output strength), then the number of the power output signals of the medium output strength in the sequence pattern can be increased. Thus, strength can be increased more reliably than before the increase in the number of the power output signals of the medium output strength. Also, if the electronic device has been detected continuously most recently by the power output signals of the small output strength (or if the medium output strength and the small output strength are away from the lowest strength at which an electronic device can actually be detected), then the number of the power output signals of the small output strength in the sequence pattern can be increased. Thus, the number of pulses of low strength can be increased more than before the increase in the number of the power output signals of the small output strength, and the average pulse strength per unit of time can be decreased.

[15] In accordance with a preferred embodiment according to any one of the power feeders mentioned above, the controller is configured to increase or decrease at least one of the medium output strength and the small output strength based on a plurality number of the most recent detection results.

[16] In accordance with a preferred embodiment according to any one of the power feeders mentioned above, the controller is configured to expand the difference between the medium output strength and the small output strength if the number of times the electronic device has been detected by the power output signals of one of the strengths is at least one half of the plurality number in the plurality number of the most recent detection results.

[17] In accordance with a preferred embodiment according to any one of the power feeders mentioned above, the controller is configured to set the medium output strength and the small output strength to specific initial setting values if the numbers of times the electronic device has been detected by the power output signals of the strengths are each less than one half of the plurality number in the plurality number of the most recent detection results.

Basically, the position of the electronic device with respect to the power feeder may not be the same every time power is fed. Thus, the strength required to detect the electronic device may have a greater variation range than the difference between the medium output strength and the small output strength (the different between the initial setting values). And there may be situations in which this greater variation range causes the strength to fluctuate greatly, without being stabilized by the increasing or decreasing control. As a result, it is particularly easy for the electronic device to be detected by the power output signals of the maximum output strength and the small output strength. In view of this, with the configuration discussed above, if the number of detections of one strength (particularly the small output strength or the maximum output strength) is at least one half of the plurality number in the plurality number of the most recent detection results, then the difference between the medium output strength and the small output strength can be expanded by a value that is less than the first value in order to increase detections by the medium output strength. This makes it less likely that there will be an instantaneous change from a state in which there are many detections by small output strength to a state in which there are many detections by maximum output strength when the increasing or decreasing control is performed. As a result, there is better control to curtail power consumption in a standby state, and more stable control can be achieved.

[18] In accordance with a preferred embodiment according to any one of the power feeders mentioned above, the sequence pattern includes the power output signals of the medium output strength and the power output signals of the small output strength that are alternately arranged with respect to each other.

[19] In accordance with a preferred embodiment according to any one of the power feeders mentioned above, the difference between the high output strength and the medium output strength is larger than the difference between the medium output strength and the small output strength.

[20] In accordance with a preferred embodiment according to any one of the power feeders mentioned above, the controller is configured to maintain the high output strength to the same during the increasing or decreasing control.

The present invention provides a power feeder with which power consumption in a standby state can be suppressed without compromising user convenience.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A power feeder comprising:
a power output signal generator that generates a plurality of power output signals of different strengths;
a controller that performs an increasing or decreasing control to increase or decrease at least one of the strengths of the power output signals based on the strengths of the power output signals at which an electronic device has been detected; and
a memory that stores the strengths of the power output signals at which the electronic device has been detected as detection results, respectively,
the controller performing the increasing or decreasing control based on a multiple number of the most recent detection results stored in the memory.

2. A power feeder comprising:
a power output signal generator that generates a plurality of power output signals of different strengths; and
a controller that performs an increasing or decreasing control to increase or decrease at least one of the strengths of the power output signals based on the strengths of the power output signals at which an electronic device has been detected,
the controller detecting the electronic device while repeatedly generating a sequence pattern of the power output signals, and performing the increasing or decreasing control based on detection frequency for each of the strengths of the power output signals at which the electronic device has been detected, with the detection frequency for each of the strength of the power output signals indicating a number of detections of the electronic device for each of the strengths of the power output signals at which the electronic device has been detected in a multiple number of recent detections of the electronic device.

3. The power feeder according to claim 2, wherein
the strengths include a high output strength, and a low output strength that is smaller than the high output strength.

4. The power feeder according to claim 3, wherein
the controller performs the increasing or decreasing control to increase or decrease the low output strength based on the detection frequency for each of the strengths of the power output signals.

5. The power feeder according to claim 3, wherein
the sequence pattern includes one power output signal of the high output strength.

6. The power feeder according to claim 3, wherein
the controller increases the low output strength by a first value if the detection frequency at the high output strength is greater than the detection frequency at the low output strength in the multiple number of the most recent detections.

7. The power feeder according to claim 6, wherein
the controller increases or decreases the low output strength by a value that is less than the first value if the detection frequency at the high output strength is less than the detection frequency at the low output strength in the multiple number of the most recent detections.

8. The power feeder according to claim 6, wherein
the low output strength has a medium output strength, and a small output strength that is smaller than the medium output strength.

9. The power feeder according to claim 8, wherein
the controller decreases the medium output strength and the small output strength by a value that is less than the first value if the detection frequency at the high output strength is less than the detection frequency at the low output strength, and if the detection frequency at the small output strength is at least a specific detection frequency.

10. The power feeder according to claim 8, wherein
the controller increases the medium output strength and the small output strength by a value that is less than the first value if the detection frequency at the high output strength is less than the detection frequency at the low output strength, and if the detection frequency at the small output strength is less than a specific detection frequency.

11. The power feeder according to claim 8, wherein
the controller increases or decreases at least one of the number of the power output signals of the medium output strength and the number of the power output signals of the small output strength based on a multiple number of the most recent detections.

12. The power feeder according to claim 11, wherein
the controller increases the number of the power output signals of the medium output strength and decreases the number of the power output signals of the small output strength in the sequence pattern if the electronic device has been detected by the power output signals of the medium output strength consecutively for a specific number, which is at least two, of the most recent detections.

13. The power feeder according to claim 11, wherein
the controller decreases the number of the power output signals of the medium output strength and increases the number of the power output signals of the small output strength in the sequence pattern if the electronic device has been detected by the power output signals of the small output strength consecutively for a specific number, which is at least two, of the most recent detections.

14. The power feeder according to claim 8, wherein
the controller increases or decreases at least one of the medium output strength and the small output strength based on the multiple number of the most recent detections.

15. The power feeder according to claim 14, wherein
the controller expands the difference between the medium output strength and the small output strength if the number of times the electronic device has been detected by the power output signals of one of the strengths is at least one half of the multiple number.

16. The power feeder according to claim 14, wherein
the controller sets the medium output strength and the small output strength to specific initial setting values if the numbers of times the electronic device has been detected by the power output signals of the strengths are each less than one half of the multiple number.

17. The power feeder according to claim 8, wherein
the sequence pattern includes the power output signals of the medium output strength and the power output signals of the small output strength that are alternately arranged with respect to each other.

18. The power feeder according to claim 8, wherein
the difference between the high output strength and the medium output strength is larger than the difference between the medium output strength and the small output strength.

19. The power feeder according to claim 3, wherein
the controller maintains the high output strength to the same during the increasing or decreasing control.

* * * * *